April 21, 1925.

J. E. BOGGIANO 1,534,899

PRESSURE REDUCING VALVE

Filed April 19, 1924

WITNESSES
Edw. Thorpe
Hugh H. Ott

INVENTOR
James E. Boggiano
BY Mumm & Co.
ATTORNEYS

Patented Apr. 21, 1925.

1,534,899

UNITED STATES PATENT OFFICE.

JAMES E. BOGGIANO, OF LAKE PLACID CLUB, NEW YORK.

PRESSURE-REDUCING VALVE.

Application filed April 19, 1924. Serial No. 707,717.

*To all whom it may concern:*

Be it known that I, JAMES E. BOGGIANO, a citizen of the United States, and a resident of Lake Placid Club, in the county of Essex and State of New York, have invented a new and Improved Pressure-Reducing Valve, of which the following is a full, clear, and exact description.

This invention has relation to valves and has particular reference to a pressure reducing valve which is principally used for steam and water pressure regulation.

One of the outstanding objects of the present invention resides in the provision of a valve of the character set forth in which the employment of springs or diaphragms is eliminated.

Another object in view resides in the provision of a valve which is capable of adjustment to take care of various conditions, and which is so constructed as to permit of ready access to the interior for the purpose of repairs and replacement of worn parts.

As a still further object the invention resides in a valve of the character set forth which is comparatively simple in its construction, inexpensive to manufacture, and which is thoroughly reliable and highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1:
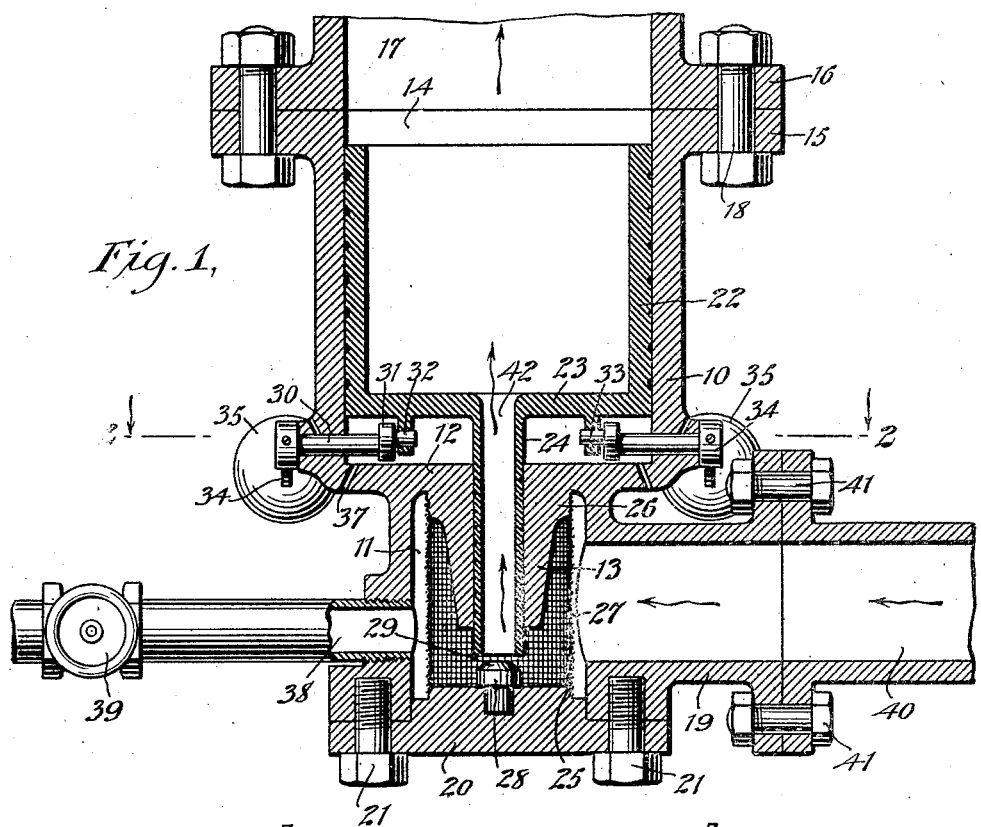
Figure 1 is a vertical sectional view through a valve constructed in accordance with the invention.
Figure 2:
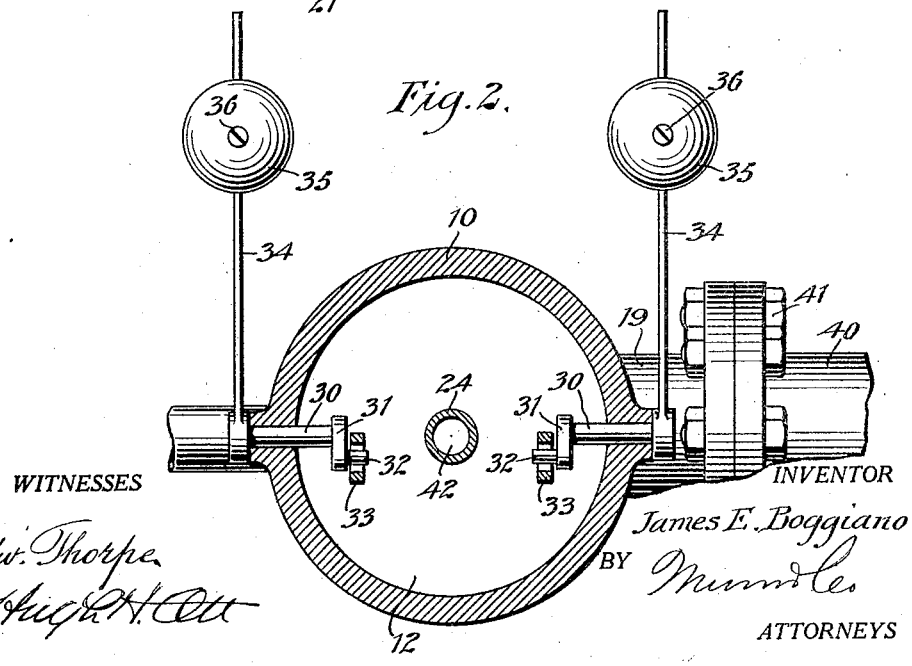
Fig. 2 is a fragmentary horizontal sectional view taken approximately on the line indicated at 2—2 in Fig. 1.

Referring to the drawings by characters of reference, the valve consists of upper and lower cylindrical body sections 10 and 11 which are separated by a horizontal partition wall 12 having a depending central bearing boss 13 extending into the lower body section 11. The upper open end 14 of the body section 10 constitutes an outlet having an annular outwardly projecting flange 15 by means of which the flanged end 16 of a pipe 17 is associated with the outlet by bolts 18. The lower body section 11 is formed with a lateral inlet 19 and the lower open end of the body section 11 is closed by a removable cover plate 20 secured in place by stud bolts 21. A hollow cylindrical piston 22 is mounted in the upper body section 10 for vertical movement. Said piston is closed at its lower end by a piston head 23 which is formed with a tubular depending stem 24, the said stem extending through the bearing boss 13 and constituting a means for establishing communication between the inlet and outlet of the valves. The upper side of the cover plate 20 is provided with an upwardly projecting reduced boss 25 and the depending boss 13 is formed with an enlarged peripheral portion 26 at its juncture with the horizontal partition wall 12 which is of the same diameter as the boss 25. A cylindrical strainer 27 of foraminous material has its upper and lower ends respectively engaged with the portion 26 and the boss 25 in vertical alignment with the tubular stem 24. A stationary closure valve member 28 is mounted centrally of the upper side of the closure plate 20 and said valve member is provided with a conical face 29 with which the lower end of the bore of the stem 24 is adapted to engage. The piston 22 and stem 24 are of sufficient weight to normally gravitate to a point where the lower end of the stem 24 will engage with the conical face 29 of the closure valve member 28 whereby communication between the inlet and outlet is cut off.

In order to provide means for counterbalancing the weight of the piston 22 whereby adjustments and regulation of the pressure may be obtained, a pair of crank shafts 30 extend at diametrically opposite points through the lower end of the upper body section 10 and are journaled in said body section for rotation. The inner end of the crank shafts are provided with crank arms 31 and crank pins 32 which crank pins extend into the slotted depending lugs 33 on the lower end wall 23 of the piston 22. The outer ends of the crank shafts 30 which project outwardly from the body section 10 have secured thereto radially projecting levers 34 which are disposed horizontally and have mounted thereon for longitudinal sliding movement weights 35 which are maintained in longitudinally adjusted position by set screws 36. The horizontal partition wall 12 is provided with vent openings 37, the outer ends of which are disposed exteriorly of the lower reduced body section 11 whereby to relieve the space between the partition wall and the lower end wall 23 of the piston of resistance offered by compression or expansion of the air trapped therein upon movement of the piston 22. At a point diametrically opposite the inlet boss 19, a drain pipe 38 is provided which is formed with a cut-off valve 39 and in practice the pressure feed pipe 40 is bolted as at 41 to the inlet boss 19.

In use and operation of the valve, the fluid under pressure enters through the inlet boss 19, passes through the strainer 27, thence upwardly through the constricted passageway 42 defined by the stem 24, thence into the piston 22 where it escapes through the outlet 14 and is carried off by the pipe 17. This reduces the pressure from its inlet point to the outlet point and regulation of the pressure reduction is accomplished by adjustment of the weights 35 to increase or decrease the spacing between the lower end of the stem and the conical face 29 of the valve 28. It is, of course, understood that the tubular stem 24 may be considerably shortened for special valves where the constricted passageway 22 causes interference with capacity discharge. It will be noted that the lower end of the stem 24 is squared off whereby to provide a face or area upon which the inlet pressure may act when the valve is closed, for raising and opening the same to permit of the establishment of communication between the inlet and outlet. It will thus be seen that springs and diaphragms have been eliminated, that the cover plate 20 may be removed for renewing the valve 28 when necessary, or for cleaning the strainer. When it is desired to drain the pipes, the valve 39 and the drain pipe 38 is open.

I claim:

1. A fluid pressure reducing valve comprising a casing including upper and lower cylindrical sections, a horizontal partition wall therebetween having a central opening, said lower section having an inlet port communicating therewith, said upper section having an outlet port communicating therewith, a weighted member movable in the upper section, a central depending tubular stem extending through the partition, a closure cap removably carried by the lower end of the lower section, a stationary closure valve member carried by the closure cap and adapted to coact with the lower end of said tubular stem upon downward movement of the weighted member whereby to regulate the size of the passageway defined thereby, said closure valve member having a conical upper end whereby the lower end of the stem when completely closed thereby defines an annular shoulder against which the fluid pressure may act to lift the weighted member and the lower end of the stem from the seat and gravity actuated adjustable counterbalancing means operatively connected with the weighted member.

2. A fluid pressure reducing valve, comprising a casing including an upper cylindrical section having an outlet port at its upper end, a lower cylindrical section having a side inlet port, a horizontal partition separating said sections, a hollow piston having a closed lower end and an open upper end mounted for movement in the upper section, a tubular depending stem from said piston extending through the partition for establishing communication between the inlet and outlet ports, a closure cap at the lower end of the lower section, a valve member carried by said closure cap and adapted to coact with the inlet end of the stem for regulating the size of the passageway defined thereby, a cylindrical strainer surrounding said stem and extending between the partition and closure cap, a drain outlet communicating with said lower section, gravity actuated counterbalancing means operatively connected with the piston, the latter means comprising a pair of crank shafts extending through diametrically opposite points at the lower end thereof, crank pins at the inner ends of said crank shafts, depending slotted lugs on the closed end of the piston receiving said crank pins, radially projecting levers at the outer end of said crank shafts, and longitudinally adjustable weights on said levers.

JAMES E. BOGGIANO.